United States Patent [19]

Benjamin

[11] 3,849,862
[45] Nov. 26, 1974

[54] METHOD OF ASSEMBLING MULTIPLE GEAR DIFFERENTIAL

[76] Inventor: Robert N. Benjamin, 1830 Kathryn Dr., Westlake, Ohio 44145

[22] Filed: Aug. 6, 1973

[21] Appl. No.: 385,834

Related U.S. Application Data

[63] Continuation of Ser. No. 265,247, June 22, 1972, abandoned.

[52] U.S. Cl............... 29/407, 29/159.2, 29/428, 29/434, 74/715
[51] Int. Cl............................................ B23q 17/00
[58] Field of Search....... 29/159.2, 407, 159 R, 428, 29/434; 74/715, 424

[56] References Cited
UNITED STATES PATENTS

| | | | |
|---|---|---|---|
| 2,022,141 | 11/1935 | Morgan | 74/715 |
| 2,070,569 | 2/1937 | Asam | 74/715 |
| 2,272,161 | 2/1942 | Frederickson | 74/715 |
| 2,859,641 | 11/1958 | Gleasman | 74/715 |
| 3,355,789 | 12/1967 | Tetsull | 29/407 X |

*Primary Examiner*—C. W. Lanham
*Assistant Examiner*—Victor A. DiPalma
*Attorney, Agent, or Firm*—Baldwin, Egan, Walling & Fetzer

[57] ABSTRACT

This invention relates to a differential gear mechanism utilizing two substantially identical gear sets in a housing or cage adapted to be driven by a drive shaft. Each set has a central worm or traction gear, sometimes called a side gear, adapted to be keyed in one instance to one of the stub shafts leading to a rear wheel of an automotive vehicle. Each of these side gears is in mesh with a plurality of transfer gear complexes, each having located centrally thereof a worm wheel in mesh with the side gear and having a reversible balancing gear at each end of the worm wheel rigidly connected with the associated worm wheel and coaxial therewith. The method of assembling the mechanism includes placing a reference index point near the periphery of the worm gear, placing said transfer gear complexes in said case in positions corresponding to those arrived at by rotating said worm gear, and positioning each transfer gear complex with a selected reference point of the complex in the same relation to the reference index point as it passes, the reference point having the same relative position in each transfer gear complex.

3 Claims, 6 Drawing Figures

METHOD OF ASSEMBLING MULTIPLE GEAR DIFFERENTIAL

This is a continuation of application Ser. No. 265,247, now abandoned, filed June 22, 1972.

This invention relates to a differential gear mechanism somewhat similar to that shown in U.S. Pat. No. 2,859,641, granted Nov. 11, 1958 to Vernon E. Gleasman, to which reference may be had for a more detailed description of the operation of this type of differential. This patented differential mechanism was satisfactory for accomplishing the purposes set forth and claimed therein, but it was somewhat noisy under certain test conditions and somewhat inefficient in delivery of power therethrough, and did not always give a good division of power between the left and right rear wheels, or drive wheels, of an automotive vehicle.

It is, therefore, an object of the present invention to efficiently mesh a plurality of transfer gear worm wheels in mesh with a side gear worm and to efficiently mesh together two half differential mechanisms so assembled.

Other objects and advantages of the present invention will be apparent from the accompanying drawings and description and the essential features thereof will be set forth in the appended claims.

In the drawings,

FIG. 4 is a side elevational view of two half differential mechanisms of the character shown in FIG. 3 completely assembled in a case; while

This invention is not limited to any specific number of transfer gear complexes composing a set of the same assembled in a differential mechanism as taught herein. The embodiments described herein involve three such transfer gear complexes as composing a complete set in a half differential gear mechanism. Two transfer gear complexes may be used, or more than three, if desired. Also, the invention is disclosed herein where each transfer gear complex consists of a centrally located worm wheel of six helices, on each end of which is a reversible balancing gear, here shown as spur gears with ten teeth each. These need not be spur gears and the number of teeth may vary according to the mechanical problem. Each side gear shown herein is a worm having ten teeth of helical configuration. Geometrically, three of such transfer gear complexes meshing with a side gear worm and utilizing balancing gears which may have varying number of teeth usually are not equally divisible into three identical meshing arrangements and it is one of the objects of the present invention to overcome this difficulty so that all of the gears involved will mesh evenly and efficiently so that in operation the power is transmitted smoothly.

Figure 3:
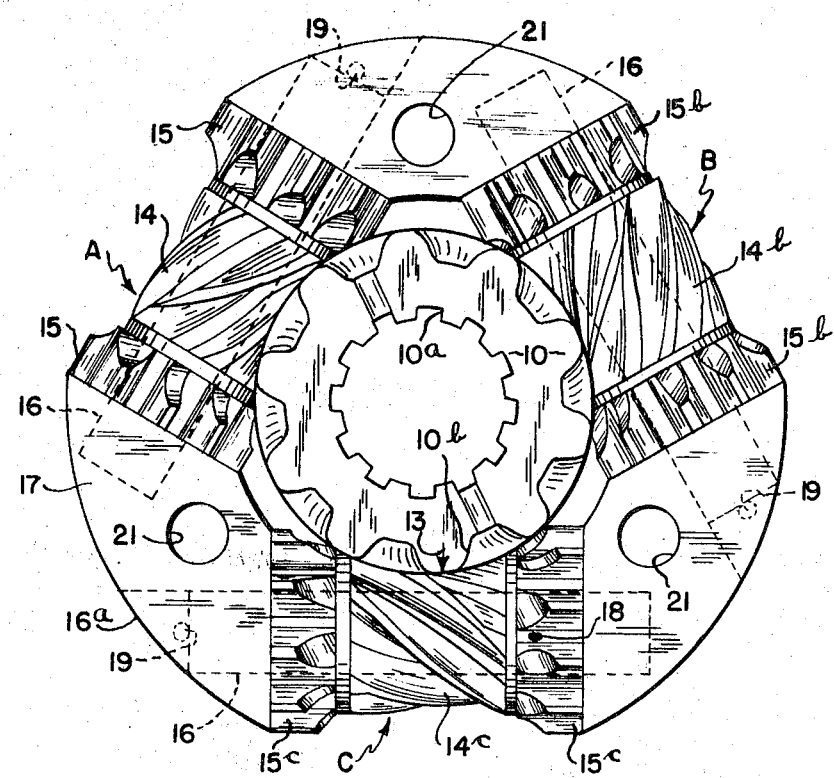
FIG. 3 is a top plan view taken along the line 3—3 of FIG. 4 and showing three transfer gear complexes assembled in a half differential mechanism as taught herein.
Figure 1:
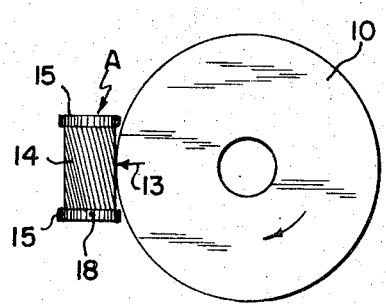
FIGS. 1 and 2 are diagrammatic sketches illustrating the method of assembling first and second transfer gear complexes in a set of three in a half differential mechanism.
Figure 2:
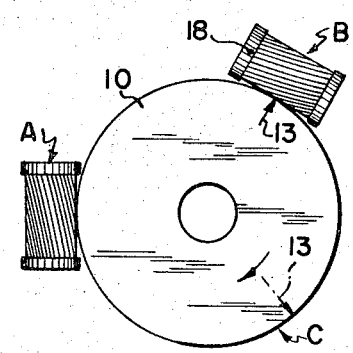
Figure 4:
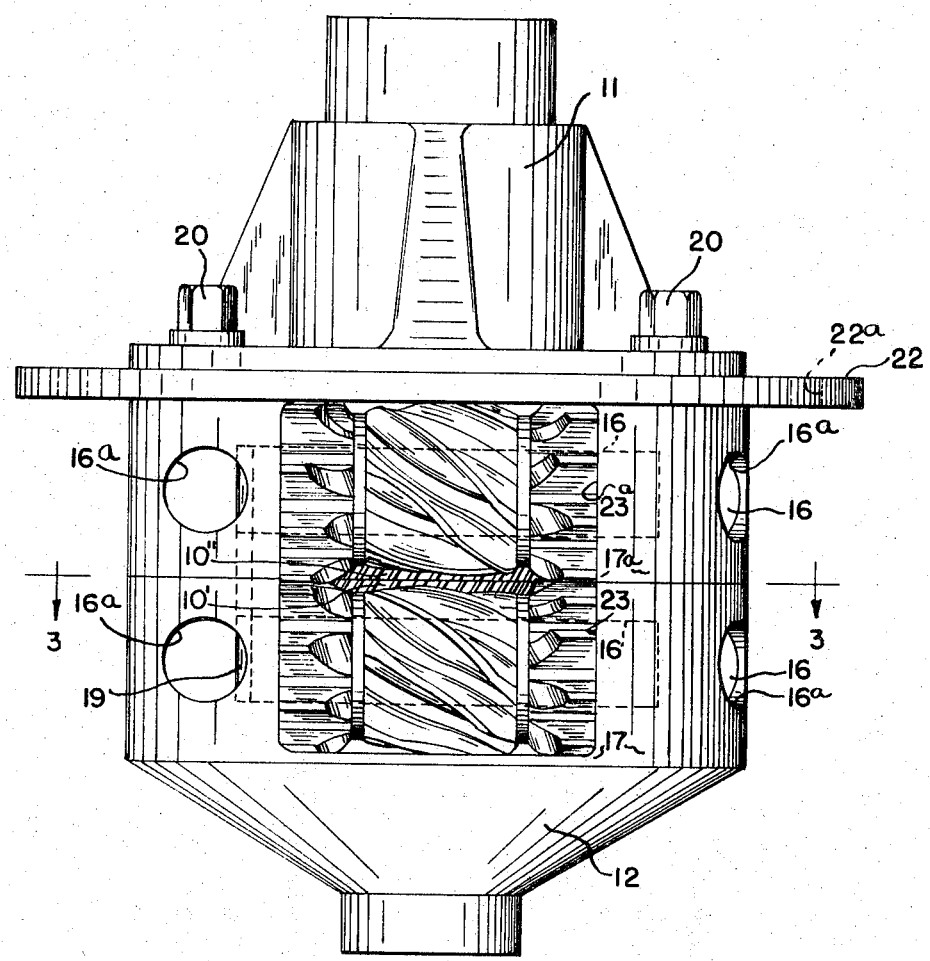

Referring now to FIGS. 1, 2 and 3, a central or side gear worm 10, sometimes referred to as a worm traction gear, is shown having internal splines for driving connection to a stub shaft going to one of the drive wheels of an automotive vehicle. It is understood that a side gear and its associated stub shaft may be integral. The worm wheel 10 of the upper half differential shown in FIG. 4 is provided with a suitable bearing (not shown) in the portion 11 of the housing. The worm wheel 10 of the lower half differential is provided with a bearing (not shown) in the housing portion 12. Referring to FIG. 1, the central worm 10 is provided with a reference index point 13, preferably at the end 10b of one of the helices of the worm 10. Each of the transfer gear complexes to be placed in mesh with the central worm 10 consists of a unitary structure of which the central portion 14 is a worm wheel adapted to mesh with the worm 10 and having at opposite ends thereof reversible balancing gears 15. Each complex 14, 15, 15, is mounted for rotation about a shaft 16 which is housed in the half differential case 17 and held in position by any suitable means such as a pin indicated at 19. Those familiar with the manufacture of gears having helical worm threads recognize that a driving key is positioned at one end of the threads to determine the initiation of the cutting operation. In this case, an indicator or reference point 18 marks this driving key position in the case of each of the worm wheels 14. In using the method of this invention, the reference index point 13 is placed in a predetermined position relative to the gear complex 14, 15, 15, here shown as substantially the central point of the worm wheel 14. The driving key position indicator or reference point 18 is then set at a preferred radial position, here pointing directly upwardly toward the person assembling the gearing, and the shaft 16 for this first transfer gear complex is placed in position to hold the gear complex in the gear half case 17. Next the central worm 10 is turned in the direction of the arrow of FIGS. 1 and 2 120° so that the index point 13 is now positioned as shown in FIG. 2. Meanwhile, the first gear complex A is allowed to turn as propelled by the mesh between worm 10 and worm wheel 14 of the first complex. With the index point 13 in the position of FIG. 2, centrally of worm wheel 14b, the second transfer gear complex B is positioned with the driving key position indicator 18 of worm wheel 14b in the same relative position as when setting the complex A, namely, vertically upwardly as shown in FIG. 2. Complex B is then fixed in the case by a shaft 16. The next step is to turn the worm 10 another 120° in the direction of the arrow of FIG. 2 to the dot-dash position of index 13 corresponding to the placing of the transfer gear complex C which is shown at the bottom of FIG. 3. Here, with the index point 13 at the midpoint of the worm wheel 14c, the third gear complex is positioned by a shaft 16 with the indicator or reference point 18 vertically upward as shown in FIG. 3. It will be understood that in locating of the gear complexes at positions B and C, in each case the shaft or pin 16 is inserted in the differential half case 17 and fixed in position by a pin 19. While turning the index point 13 from the location of gear complex B to the location of the complex C, the worm wheels 14 and 14b are permitted to turn freely in mesh with the central worm 10.

The half differential mechanism just described as assembled in the half case 17, is the lower portion of the differential shown in FIG. 4. Then the upper portion 17a is assembled in an identical manner. The two half differentials in case portions 17 and 17a are thereafter assembled in a unit as shown in FIG. 4 with complexes A, B and C in the two half cases mutually in registration. The two half cases are held in position by stud bolts 20 that pass through openings 21a in the gear case half 17a registering with other openings 21 in the case half 17 as shown in FIG. 3. The openings 21 may be provided with threads to receive the threaded end of the stud bolt 20. The portion 12 of the differential casing is preferably formed integrally with the half case portion 17 and the portion 11 is held in the assembled position of FIG. 4 by the bolts 20. The flange 22 shown in FIG. 4 is provided with a plurality of bolt holes 22a for attachment to the ring gear which forms part of the differential driving mechanism.

In a production line, one would not wish to go through the procedure outlined herein with respect to FIGS. 1, 2 and 3 and this may be avoided very simply. It is clearly seen in FIGS. 3 and 4 that window openings 23 and 23a are provided opposite the gear complexes A, B and C and when the gear complexes have been all assembled as shown in FIG. 3, one may note on each of the complexes of a given set the position of the indicator 18 where it is visible through the windows 23 and 23a or, if it is not visible in a given instance, then a point 180° from position 18 may be indicated in such case so that the gears may be properly assembled looking through the windows 23 and 23a having noted the position of the indicators 18 of FIG. 3 when looked at horizontally. Thus assembled, the mechanism clearly embodies the present invention.

It was mentioned hereinabove that the differential case halves 17 and 17a, as described in connection with FIG. 3, are placed together in final assembly as shown in FIG. 4. If the balancing gears 15, 15b and 15c have an odd number of teeth, then they will mesh directly with similar gear teeth in the other half case. If the balancing gears have an even number of teeth, then the central worm 10 should be turned slightly in one of the half differential mechanisms to advance the balancing gears thereof by the amount of one-half tooth before the upper end lower half sets are placed together.

In some differential mechanisms, what has been described herein as half of a gear mechanism in case portion 17 and another half portion in 17a are all housed in a single housing which must be assembled from the top. With this type of mechanism, the gear complexes are first assembled in the lowermost portion of the housing by placing the central worm 10' in position and orienting the transfer gear complexes A, B and C as taught herein. Then, with the index point 13 returned to the position of FIG. 1 of the drawings accompanying this description, another central worm 10'' is placed directly on the first worm 10' with a reference index point like 13 vertically above point 13 of the lower set. The upper set of three transfer gear complexes is then placed in position around worm 10'' by repeating the operation as in the lower set, thus placing the complexes like A, B and C over similarly indicated complexes on the lower level of the mechanism.

Figure 5:
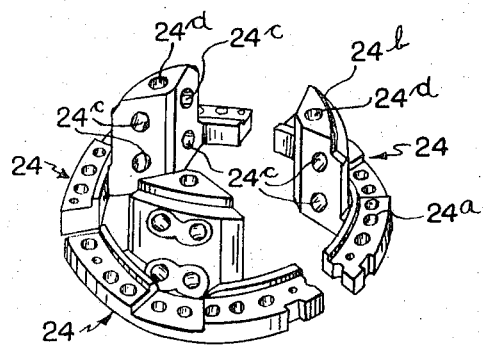
FIGS. 5 and 6 show another case into which this invention may be assembled, FIG. 5 being a perspective view of parts which hold three gear complexes, and FIG. 6 being a perspective view showing the embodiment completely assembled.
Figure 6:
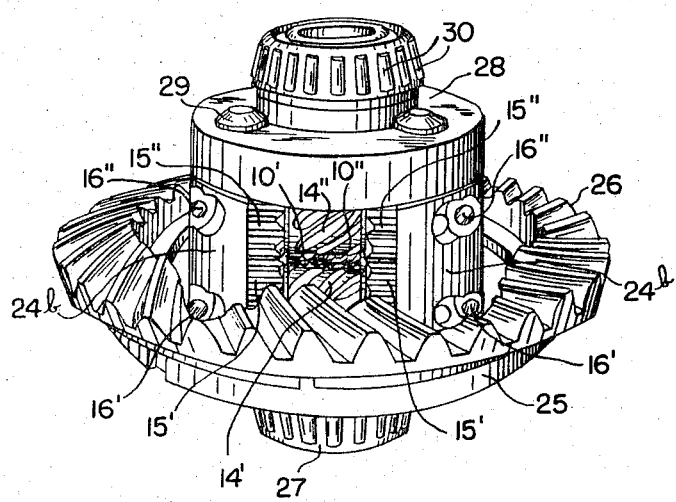

A housing for carrying out the assembly operation described in the preceding paragraph is shown in FIGS. 5 and 6. Three identical sector shape portions 24 each have a flange member 24a and an upstanding member 24b. In the above mentioned method of assembly in the preceding paragraph, the flange portions 24a are bolted to a ring 25 to which also is bolted a ring gear 26 lying above the flange members 24a. Those familiar with this art will understand that the ring gear meshes with a bevel gear on the end of the propeller drive shaft of the vehicle. Referring to FIG. 6, three transfer gear complexes are assembled as just described evenly spaced around the central worm 10'. Each of these transfer gear complexes comprises an intermediate worm gear 14', at opposite ends of which, and unitarily connected with the worm wheel are two balancing gears 15' like the assembly shown in FIG. 3. The upper set of gears includes a central worm 10'' about which three gear complexes are assembled also as above described, and each complex includes a central worm gear 14'', at each end of which is a balancing gear 15''. A shaft 16' or 16'' passes through each transfer gear complex, as in the first described embodiment, and these are received in suitable openings 24c in the upstanding portions 24b of the three members 24. Then a member (not shown) is secured to the underside of ring member 25 as seen in FIG. 6 and this holds a bearing 27 for a stub shaft running to one of the drive wheels of the vehicle. A cap 28 holds the entire structure together by means of three bolts 29 which pass through the cap 28, then through openings 24d in the members 24 and then through the structure shown in FIG. 6 as the ring 25 and the members supported therebelow. The cap 28 carries a bearing 30 for a drive shaft extending to the opposite wheel of the vehicle. It will be noted that certain portions of the ring gear 26 are cut away in FIG. 6 to more clearly show how the present invention is assembled in the portions 24.

In any case, no matter how assembled, this invention presents a set of gears including a central worm, sometimes called a side gear, around which are assembled a plurality of transfer gear complexes, each of which is a unitary structure including a worm wheel meshing with the side gear with a balancing spur gear at each end of the worm wheel, characterized in that during rotation of the side gear, a fixed index or reference point thereon passes through the same reference point of each transfer gear complex in the same positional relation. Also, each set of the differential mechanism, as described herein, sometimes called a half differential mechanism, separately goes through the same cycle, no matter how assembled. This invention substantially cancels out errors which occur in the machining of the gears, worms and worm wheels forming elements of the differential herein described and establishes the correct index relation to facilitate proper assembly. Thereby eccentric oscillation of side or traction gears 10 is eliminated.

The differential mechanism disclosed herein can be caused to run even in a more smoothly related manner, if desired, by utilizing a gear arrangement disclosed and claimed in the copending application of Vernon E. Gleasman, Ser. No. 158,672, filed July 1, 1971, which teaches that the balancing gears 15 at opposite ends of the worm wheel 14 should have the teeth of one of these balancing gears indexed relative to the teeth of the other balancing gear of the same unitary structure by an amount between one-half of the circular pitch and full registration whereby when these are meshed with the coacting balancing gears in the other differential half mechanism, the teeth of only one of the pair of matching gears 15 is in full mesh with its coacting gear at any given time.

Other than as described herein, the differential gear mechanism as shown in the drawings and described in the specification operates in the same manner as the invention described in U.S. Pat. No. 2,859,641, to which reference may be had if further information is needed.

The present invention teaches the assembly of the differential gear mechanism so that all parts of intermeshing teeth and gears take their share of the load so that the mechanism provides a smoother action and has a longer life than that disclosed in U.S. Pat. No. 2,859,641.

As used in the specification and claims herein, the term "worm" or "worm gear" also includes a helical gear, regardless of the helix angle.

What is claimed is:

1. The method of assembling in a case, a differential gear mechanism comprising a central worm traction gear surrounded by a plurality of identical unitary transfer gear complexes each having a reversible balancing gear at each end and a worm wheel intermediate said balancing gears, said balancing gears and worm wheel being coaxial, each transfer gear complex being assembled in said case by means of a shaft for rotation with its axis parallel to a tangent to said worm gear and with its worm wheel meshing with said worm gear; said method including placing a reference index point near the periphery of said worm gear, and placing said transfer gear complexes in said case in positions corresponding to those arrived at by rotating said worm gear, and positioning each transfer gear complex with a selected reference point of the complex in the same relation to said reference index point as it passes, said reference point having the same relative position in each transfer gear complex, whereby eccentric oscillation of said worm gear is substantially eliminated.

2. The method of assembling a differential gear mechanism as defined in claim 1, wherein said reference point of each complex is at one end thereof and having a fixed circumferential relation with a driving key position determining the circumferential position of the helical threads of the worm wheel of the complex, and each transfer gear complex is fixed in said case when said reference index point of the associated worm traction gear substantially coincides with the mid-point of the worm wheel of the complex and said reference point is upward.

3. The method of assembling a differential gear mechanism as defined in claim 1, including the steps of (1) placing a first of said transfer gear complexes with its axis generally parallel to a tangent to said worm traction gear and in a predetermined position relative to said index point and with said worm wheel meshing with said worm traction gear and with said indicator in a predetermined radial position, (2) positioning said shaft to mount said first complex in said position in said case, (3) turning said worm traction gear and said complex already in mesh therewith until said reference index point reaches the next position to space another of said transfer gear complexes so that said plurality of complexes will be evenly spaced about the periphery of said worm traction gear, (4) repeat steps (1) and (2) with respect to said other complex, (5) continuing the repetition of steps (3), (1) and (2) until all of said complexes are assembled in said case, and assembling two of said differential mechanisms in a case with the worm traction gears thereof adjacent and coaxial and with said balancing gears of said two mechanisms in mesh and with the transfer gear complexes of one mechanism in order of assembly respectively opposite the complexes of the other mechanism in the same order of assembly.

* * * * *